United States Patent [19]

Vilard

[11] Patent Number: 5,489,948
[45] Date of Patent: Feb. 6, 1996

[54] PICTURE DISPLAY APPARATUS WITH BEAM SCAN VELOCITY MODULATION

[75] Inventor: Philippe Vilard, Houilles, France

[73] Assignee: U.S. Philips Corporation, New York, N.Y.

[21] Appl. No.: 315,157

[22] Filed: Sep. 29, 1994

[30] Foreign Application Priority Data

Oct. 13, 1993 [FR] France ................................. 93 12185

[51] Int. Cl.$^6$ ................................. H04N 5/68; H04N 3/32
[52] U.S. Cl. ................................. 348/626; 348/707
[58] Field of Search ................................. 348/626, 725, 348/730, 707; 358/242, 166; 315/371; H04N 5/208, 3/22, 5/68

[56] References Cited

U.S. PATENT DOCUMENTS

| | | | |
|---|---|---|---|
| 4,170,785 | 10/1979 | Yoshida | 348/626 |
| 4,185,301 | 1/1980 | Mitsuda | 348/626 |
| 5,072,300 | 12/1991 | Anderson | 358/242 |

FOREIGN PATENT DOCUMENTS 469566  2/1992  European Pat. Off. .

Primary Examiner—James J. Groody
Assistant Examiner—Sherrie Hsia
Attorney, Agent, or Firm—Bernard Franzblau

[57] ABSTRACT

A television set includes a circuit for modulating the horizontal velocity of the beam scan as a function of the video content with the aid of an auxiliary line deflection coil. The beam scan velocity modulation circuit includes a video signal differentiator circuit followed by an amplifier provided at the output of a power stage of the current generator type, which has its output connected to one terminal of the auxiliary line deflection coil. A voltage amplifier is provided at the output of a power stage of the voltage generator type which has its input connected to the output of the differentiator circuit, and its voltage output connected to the other terminal of the auxiliary line deflection coil.

13 Claims, 2 Drawing Sheets

1

PICTURE DISPLAY APPARATUS WITH BEAM SCAN VELOCITY MODULATION

BACKGROUND OF THE INVENTION

1. Field of the Invention

The present invention relates to a picture display apparatus comprising a video signal source having its video signal information components displayed by said apparatus, a horizontal scanning circuit with a line deflection coil, and a vertical scanning circuit, for displaying said picture by means of a spot on the screen of a picture tube, a beam scan velocity modulation circuit coupled to said video signal source for modulating the horizontal velocity of the spot as a function of the video content of said video signal with the aid of an auxiliary line deflection coil, and comprising a video signal differentiator circuit followed by a transconductance amplifier (i.e. an amplifier having a voltage input and a current output) having at its output a power stage of the current generator type whose current output is connected to a first terminal of the auxiliary line deflection coil. The beam scan velocity modulation circuit has for its object to achieve a neater appearance of the luminance transitions in a picture.

2. Description of the Related Art

A beam scan velocity modulation circuit is disclosed in U.S. Pat. No. 5,072,300. This document describes in detail (FIG. 3) a circuit which includes a differentiator circuit of the video signal, followed by a transconductance amplifier whose current output is connected to a first terminal of an auxiliary line deflection coil. The AC current in this coil, outputted by the second terminal, is drained towards a voltage reference terminal (ground) across a coupling capacitor. A problem encountered in assemblies of this type is the following: in order to correct rapid luminance variations, it must be possible to produce rapid current variations in the auxiliary coil already mentioned, and as is commonly known, to accomplish this, the voltage induced by the self-induction of the coil must be overcome, which requires high supply voltages. The supply voltage utilized by the assembly of this document is 135 volts, using a coil whose self-induction has a value of 6.7 µH.

SUMMARY OF THE INVENTION

The invention has for its object to provide a circuit which can operate with a relatively low supply voltage. An obvious solution consists in reducing the self-induction of the auxiliary coil. One is however rapidly restricted in this approach by the fact that the currents which must then be produced are too high.

This problem is solved by the fact that the velocity modulation circuit further includes a voltage amplifier having a power stage of the voltage generator type, the input of which is connected to the differentiator output, and the output of which is connected to the second terminal of the auxiliary line deflection coil. Preferably, the power stage of the voltage amplifier is basically formed by a first transistor of a first polarity, arranged as an emitter follower, the collector of which is connected to a power supply terminal and the emitter of which is connected to the second terminal of the auxiliary coil, and by a second transistor of a second polarity which is also arranged as an emitter follower, the collector of which is connected to a reference terminal and the emitter of which is connected to the second terminal of the auxiliary coil, the bases of the two transistors being interconnected and connected to the output of a voltage preamplifier which precedes the power stage and has its input connected to the output of the differentiator circuit of the video signal.

When the power stage of the transconductance amplifier is basically constituted by a first transistor of a first polarity, arranged as a current generator, which first transistor has its emitter connected to a supply terminal and its collector connected to the first terminal of the auxiliary coil, and by a second transistor of a second polarity arranged as a current generator, which second transistor has its emitter connected to a reference terminal and its collector also connected to the first terminal of the auxiliary coil, a diode is advantageously inserted in the path of the collector current of each of the two transistors of the power stage between the collector and the first terminal of the auxiliary coil, this diode being arranged in the positive direction relative to the current from the relevant transistor.

This allows a voltage having a value higher than the value of the supply voltage of the assembly to develop at the terminals of the auxiliary coil.

These features of the invention and further more detailed features will become more apparent from the following description of a non-limitative embodiment.

DESCRIPTION OF THE PREFERRED EMBODIMENT

Figure 1:
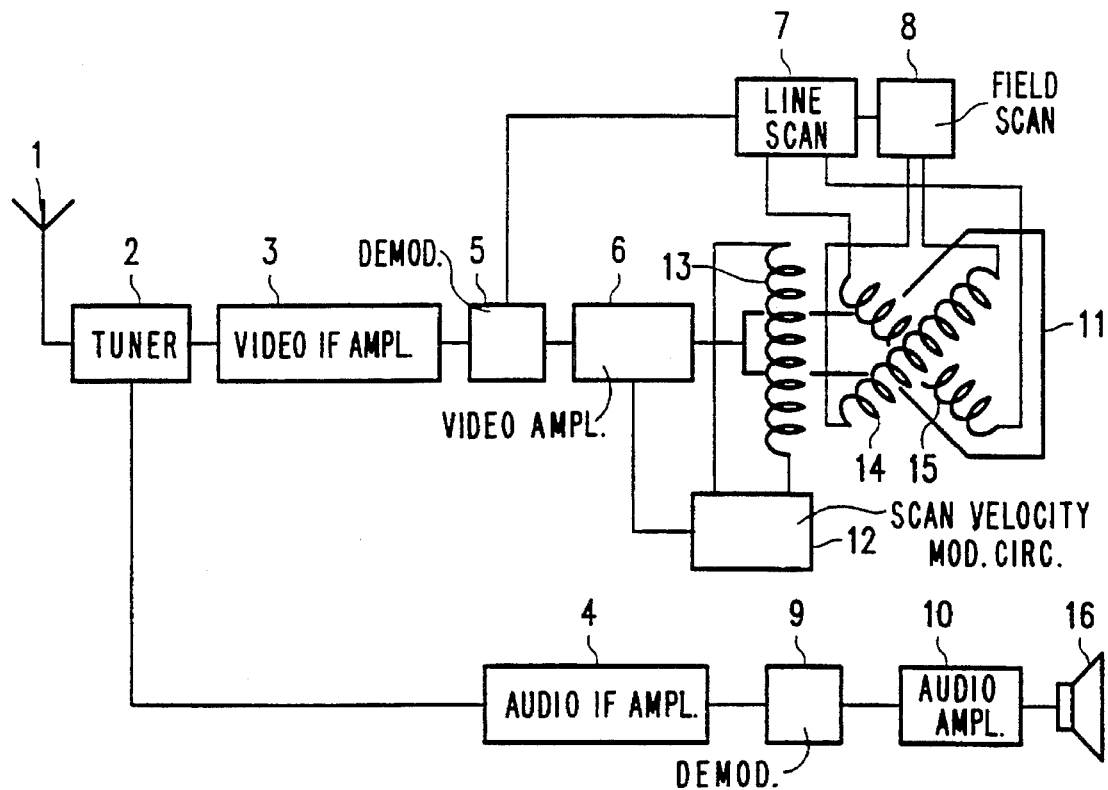
FIG. 1 shows, schematically, a television set provided with a beam scan velocity modulation circuit.

The invention will be described with reference to a television set, but it must be understood that it also relates to any type of picture display apparatus. The principles of the beam scan velocity modulation and their effect on the luminance transistions are well known. It will be remembered that it concerns an artificial manner of giving the audience the impression that the picture is defined to a better extent than it actually is. To obtain this effect the luminance signal is allowed to pass through a differentiator circuit and an instantaneous difference in velocity is applied to the line deflection system of the beam in synchronism with a transition in the value of the luminance. As it will be difficult to introduce a velocity variation in the known line deflection circuits, it is preferable an auxiliary deflection coil, located near the main coils, and through which a spot velocity correction current is passed, which is proportional to the derivative with respect to time of the luminance signal. The television set the circuit diagram of which is shown in FIG. 1, includes a tuner 2 which receives a signal from an aerial 1 (or from any other source), and converts its frequency to the frequency required by a video I.F. amplifier 3 and by an audio I.F. amplifier 4 subsequent thereto. The video I.F. amplifier 3 is followed by a demodulator 5 which applies the baseband video signals to a video amplifier 6, and synchronizing signals to a line scanning stage 7 and to a field scanning stage 8. The video signals and the synchronizing signals used by the modules 6 and 7 may alternatively originate from an exterior source such as a satellite decoder or a video recorder. The amplifier 6 applies the appropriate signals to the electrodes of a picture tube 11 (cathode-ray tube). The field and line scanning stages 8 and 7 apply currents to the main deflection coils 14 and 15, "field" and "line", respectively. The audio i.f. amplifier 4 is followed by a demodulator 9 which applies baseband audio signals to an audio amplifier 10, which feeds a loudspeaker 16. Finally, the luminance signals are transmitted from the video amplifier 6 to a scan velocity modulation circuit 12, which applies a horizontal scan velocity modulation current as a function of the video content of the video signal to an auxiliary horizontal deflection coil 13. Since the circuit 12 inevitably introduces delays in the signals, there is a risk that its action is not correctly synchronized with the video signal applied to the tube 11. To obviate this fault, delay circuits (not shown) producing a delay of approximately 70 nS are incorporated in known manner in the path of each of the colour components in the video amplifier 6.

In order to generate a current proportional to the derivative of the luminance signal with respect to the time in a self-induction coil, either said current must be introduced by means of a current generator, or a voltage must be applied to the coil which is itself the derivative, with respect to time, of the current to be obtained. In the latter case, a second differentiator circuit must be provided, and for that reason the use of a current generator is, in general, preferred.

Figure 2:
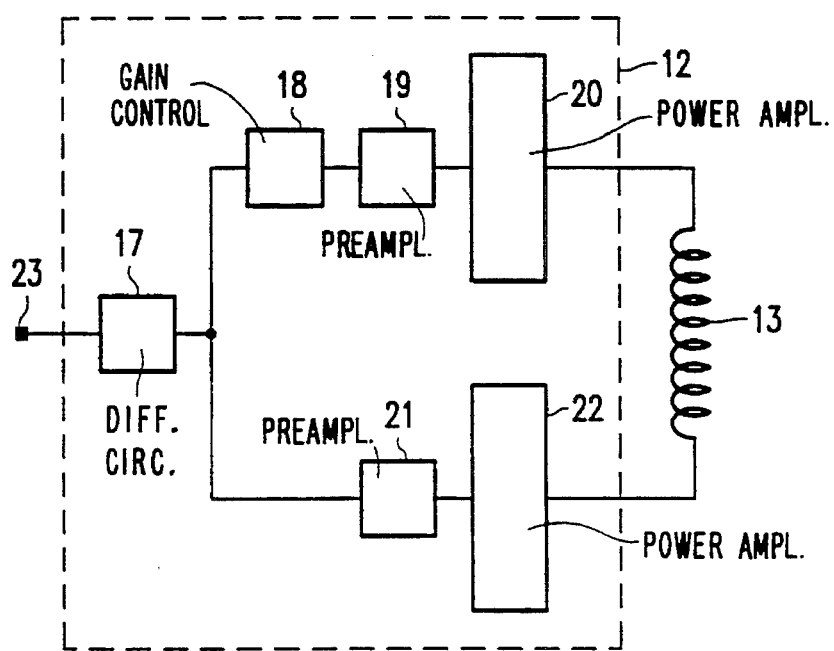
FIG. 2 shows, schematically, a beam scan velocity modulation circuit.

The velocity modulation circuit shown in FIG. 2 comprises a video signal input 23, connected to a differentiator circuit 17 that differentiates the video signal, followed by a gain control stage 18, a first preamplifier 19 and a first power stage 20 of the current generator type whose current output is connected to a terminal of the auxiliary coil 13. The output of the differentiator circuit 17 is also connected to a second preamplifier 21 followed by a second power stage 22 which is of the voltage generator type and whose voltage output is connected to the other terminal of the auxiliary coil 13. Thus, although the amplifier 21, 22 is a voltage generator, a second differentiator circuit is not provided. In practice, the voltage amplifier behaves as a switched-mode supply controlled by the signal coming from the differentiator circuit 17 and connecting, in accordance with the desired current direction, the second terminal of the auxiliary coil 13 (the lower terminal in the Figure) to either the power supply or to ground.

Figure 3:
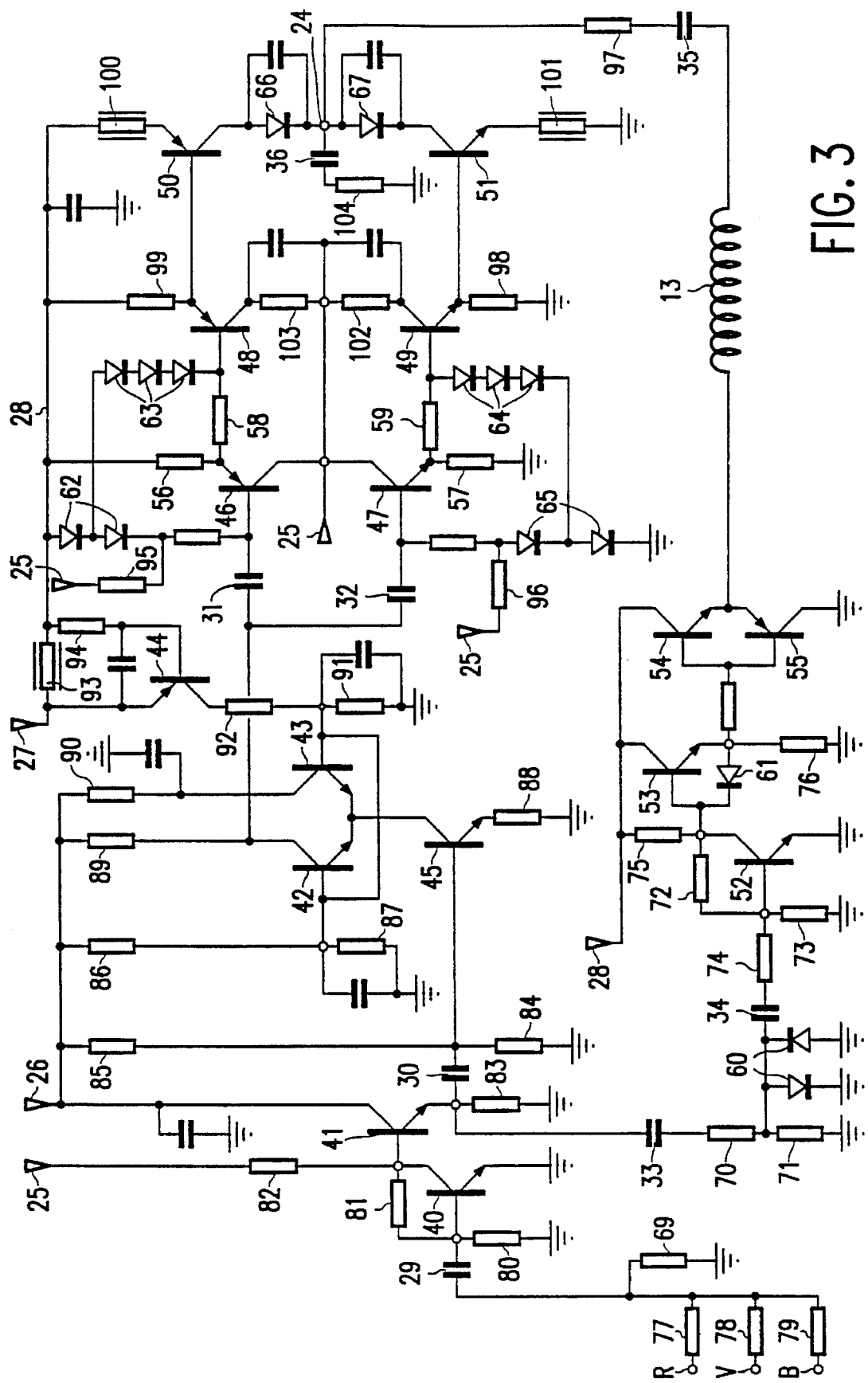
FIG. 3 is a detailed circuit diagram of an embodiment of a beam scan velocity modulation circuit.

The circuit of FIG. 3 is a detailed representation of a special embodiment of the elements of FIG. 2.

The three components R, V, B (red, green, blue) are fed, in the left-hand part of the Figure, to a resistor network 77,78,79 which are interconnected in a junction point and connected to ground through a resistor 69 and constitute a matrix circuit which at the junction point furnishes the sum of the three components, that is to say it restores the luminance. This luminance is transferred by a capacitor 29 to the base of an NPN-type transistor 40 which is arranged in a common-emitter configuration and is biased by a bridge formed by two resistors 80,81 connected to the collector of the transistor. The time constant produced by the capacitor 29 and the different impedances connected thereto are chosen such that they achieve the desired differentiator effect. The amplified signal taken from a load resistor 82 connected to a positive power supply source 25 is fed to the base of an NPN-type transistor 41, which is connected as an emitter-follower, whose collector is directly connected to a positive power supply source 26 and its emitter to ground by a resistor 83. The assembly comprising the capacitor 29 and the transistors 40,41 corresponds to the differentiator circuit 17 of FIG. 2.

From the emitter of the transistor 41 the amplified signal is fed via a capacitor 30 to the base of an NPN-type transistor 45, biased by a bridge formed by two resistors 84,85 connected between the power supply source 26 and ground, and arranged in a common-emitter configuration, having however a resistor 88 in its emitter path to improve the linearity. This transistor forms the "tail" of a well-known differential assembly constituted by the transistor 45 and by a pair of NPN-type transistors 42,43 which are loaded by respective collector resistors 89,90. The transistor 42 is biased by a bridge formed by two resistors 86,87 connected between the power supply source 26 and ground. The base is decoupled to ground by a capacitor.

The transistor 43 is biased by a special assembly constituted by a current source 44 which applies its current to two series-arranged resistors 92,91, to whose junction point the base of the transistor 43 is connected. The PNP-type transistor 44 constitutes a current source with its emitter connected to a positive power supply source 27. To this same source 27 there is connected a first end of a low-value resistor 93, which serves as a measuring resistor, through which the supply current of the power stages passes. The base of the transistor 44 is connected via a resistor 94 to the second end of the resistor 93 and thus the d.c. base/emitter voltage of this transistor increases when the current in the power stage increases. Then the current in the transistors 44 and 43 also increases and in response thereto the current in the transistor 42 decreases. The output signal of the assembly being taken from the collector of the transistor 42, the gain of the assembly consequently decreases when the current in the power stage increases. This provides an automatic control of this current. The said second end of the resistor 93 further forms a power supply terminal denoted by 28 which feeds several elements of the circuit. The assembly comprising the transistors 45,42,43 corresponds to the gain control stage 18 of FIG. 2.

The signal on the collector of the transistor 42 is simultaneously fed via two capacitors 32,31 to the two inputs of a push-pull preamplifier of a type known per se, provided with two gain paths respectively formed by a cascade arrangement of two NPN transistors 47,49 which are both arranged as emitter followers, and a cascade arrangement of two PNP transistors 46,48 which are also both arranged as emitter followers. The collectors of these four transistors are all connected to the power supply source 25. The input transistor 46 of the PNP path is biased, from the power supply source 28, by means of two series-arranged diodes 62 which output towards the supply 25 via a resistor 95, the base of the transistor 46 being connected by a resistor to the junction point between the resistor 95 and the diodes 62. The emitter of the transistor 46 is connected by a resistor 58 to the base of the transistor 48, which provides biasing of the latter. From the power supply 28, one finds the two d.c. voltages of the series-arranged diodes 62, which equal the two corresponding series base-emitter voltages 48 and 46, which provides a correct biasing of these two transistors. The transistors 47 and 49 of the NPN path are biased in a similar, but symmetrical manner, from the power supply source 25, by means of a resistor 96 which outputs into two series-arranged diodes 65 towards ground, the base of the transistor 47 being connected by a resistor to a junction point between the resistor 96 and the diodes 65, and the emitter of the transistor 47 being connected by a resistor 59 to the base of the transistor 49.

The base of the transistor 48 is connected by a cascade arrangement of three series-arranged diodes 63 to the junction point of the two diodes 62, which causes a clipping of the base signal of this transistor, thus preventing it from decreasing more than three times the value of a diode d.c.

voltage relative to the voltage at the junction point of the two diodes 62, which is substantially equal to just the mean bias value of the base of the transistor. In a symmetrical manner, the base of the transistor 49 is connected by a cascade arrangement of three series-arranged diodes 64 to the junction point of the two diodes 65, which causes a clipping of the base signal of this transistor, preventing it from increasing more than three times the value of a diode d.c. voltage value relative to the voltage at the junction point of the two diodes 65.

The emitter of the transistor 46 is connected to the power supply 28 via a load resistor 56, the emitter of the transistor 47 is connected to ground via a load resistor 57, the emitter of the transistor 48 is connected to the power supply 28 via a load resistor 99, and the emitter of the transistor 49 is connected to ground by via a load resistor 98. Resistors 102 and 103, each decoupled by a capacitor, arranged in series in the respective collector paths of the transistors 49 and 48, serve to limit the power dissipated in these transistors. The assembly comprising the transistors 46 to 49 corresponds to the preamplifier 19 of FIG. 2.

Finally, the signal at the emitters of the transistors 48 and 49 control the bases of the power transistors PNP 50 and NPN 51, respectively, which are arranged in series relative to each other, both arranged as current generators, having emitter resistors 100 and 101, respectively. Two series-arranged diodes 66 and 67 are inserted between the collectors of the transistors 50 and 51, and one end of the auxiliary coil 13 is connected to the junction point 24 of these diodes. These diodes play the following part: if, for example, a significant current circulates through the coil 13 and in the transistor 51 and if the latter is suddenly cut-off, the voltage at point 24 then increases significantly, and the presence of tile diode 66 makes it possible to prevent reverse biasing of the transistor. Between the junction point of the diodes 66,67 and ground there is further arranged a series arrangement of a resistor 104 and a capacitor 36, which is customary in this type of amplifier (so-called "Boucherot"), and has for its object to prevent self-oscillations in certain circumstances. Furthermore, a further series arrangement of a resistor 97 and a capacitor 35, which is also customary in this type of amplifier, is inserted in series with the coil 13, to damp the self-induction.

The arrangement comprising the transistors 50 and 51 constitutes the power stage denoted by reference numeral 20 in FIG. 2.

The signal from the differentiator circuit of the video signal, that is to say the signal at the emitter of the transistor 41, is also fed via a capacitor 33 and a resistor 70, a capacitor 34 and a resistor 74 to the input of a second preamplifier formed by the transistors 52 and 53. Two zener diodes 60, arranged head-to-tail, which are connected to ground between the resistor 70 and the capacitor 34, serve to limit the peak voltage. A resistor 71 has for its object to fix tile average level of the d.c. voltage. The signal is transferred to the base of the NPN-type transistor 52 arranged in a common emitter configuration, and biased by a bridge formed by two resistors 72,73 connected to the collector of the transistor. The amplified signal, taken from a load resistor 75 connected to the power supply source 28 (the same as the source feeding the transistors 46 and 51) is fed to the base of the NPN-type transistor 53, arranged as an emitter follower, whose collector is directly connected to the power supply source 28, and whose emitter is connected to ground by a resistor 76. A diode 61, arranged head-to-tail with the emitter-base diode of the transistor, serves to accelerate the transmission of the negative voltage transitions. The arrangement comprising the transistors 52 and 53 corresponds to the preamplifier 21 of FIG. 2.

Finally, the signal at the emitter of the transmitter 53 is connected together to the two bases of the power transistors NPN 54 and PNP 55, which are arranged in an emitter follower configuration in series relative to each other and have their emitters interconnected.

The other end of the auxiliary coil 13 is connected to the output of the stage 54, 55, i.e. to the junction point of the transistors 54,55. In an embodiment which furnishes good results and utilizes an auxiliary horizontal deflection coil of 2.5 μH, the components have the following values or are of the following types:

transistors:
  no.40,41=BC848,  no.42,43=BC847,  no.44=BC858, no.45,47,49,52,53=BC547, no.46,48=BC557, no.50, 55=BD826, no.51,54=BD825, diodes:
  no.60=BZV87, no.61 to 65=LL4148, no.66,67=LL4150, capacitors:
  no.29=100 pF, no.30,35,36=27 nF, no.31 to 34=1 nF, resistors:
  no.70, 74,83,89,90=1 kΩ, no.71=10 kΩ, no.72=12 kΩ, no.73=470Ω, no.75,76=1.2 kΩ, no.77,78,79=2.2 kΩ, no.55,59,80,82=560Ω, no.81=4.7 kΩ, no.84=15 kΩ, no.85=82 kΩ, no.86=22 kΩ, no.87=12 kΩ, no.88= 390Ω, no.91=68 kΩ, no.92,94=56 kΩ, no.93,100,101= 10Ω, no.95,96=15 kΩ, no.97=150Ω, no.98,99=33Ω, no.56,57,102,103=330Ω, no.104=100Ω.

The resistors 93, 100 and 101 are so-called safety resistors which destroy themselves without flames when overloaded.

supply voltages:
  no.25=15 volts, no.26=30 volts, no.27=33 volts.

I claim:

1. A picture display device comprising:
   a video signal source providing a video signal having video signal information components for display by a picture tube, a horizontal scanning circuit with a line deflection coil and a vertical scanning circuit for displaying a picture by means of a spot scanned on the screen of the picture tube,
   a beam scan velocity modulation circuit coupled to said video signal source for modulating the horizontal velocity of the spot as a function of the video content of said video signal with the aid of an auxiliary line deflection coil, and comprising a video signal differentiator circuit followed by a transconductance amplifier having an output including a power stage of the current generator type whose current output is connected to a first terminal of the auxiliary line deflection coil, wherein the beam scan velocity modulation circuit further includes a voltage amplifier having a power stage of the voltage generator type with an input connected to an output of the video signal differentiator circuit, and having an output connected to a second terminal of the auxiliary line deflection coil.

2. A picture display device as claimed in claim 1, wherein the power stage of the voltage amplifier includes a first transistor of a first polarity, arranged in an emitter follower configuration, having a collector connected to a supply terminal and an emitter connected to the second terminal of the auxiliary line deflection coil, and a second transistor of a second polarity also arranged in an emitter follower configuration, whose collector is connected to a reference terminal and whose emitter is connected to the second terminal of the auxiliary line deflection coil.

3. A picture display device as claimed claim 2, wherein bases of the first and second transistors are interconnected and are connected to an output of a voltage preamplifier which precedes the voltage amplifier power stage and an input of which is connected to the output of the video signal differentiator circuit.

4. A picture display device as claimed in claim 1, wherein the power stage of the transconductance amplifier includes a first transistor of a first polarity arranged as a current generator, the emitter of the first transistor being connected to a supply terminal and the collector being coupled to the first terminal of the auxiliary line deflection coil, and a second transistor of a second polarity arranged as a current generator with an emitter thereof connected to a reference terminal and a collector coupled to the first terminal of the auxiliary line deflection coil, wherein, the current path of the collector of each of the first and second transistors of the transconductance amplifier power stage incorporates a diode connected between the respective collector and the first terminal of the auxiliary line deflection coil, each diode being arranged in a forward direction relative to the current of the respective associated transistor.

5. A picture display device as claimed in claim 2, wherein the power stage of the transconductance amplifier includes a third transistor of a first polarity arranged as a current generator, the emitter of said third transistor being connected to a supply terminal and the collector being coupled to the first terminal of the auxiliary line deflection coil, and a fourth transistor of a second polarity arranged as a current generator with an emitter thereof connected to a reference terminal and a collector coupled to the first terminal of the auxiliary line deflection coil, wherein, the current path of the collector of each of the third and fourth transistors of the transconductance amplifier power stage includes a diode connected between the respective collector and the first terminal of the auxiliary line deflection coil, each diode being arranged in a forward direction relative to the current of the respective associated third and fourth transistor.

6. A picture display device as claimed in claim 3, wherein the power stage of the transconductance amplifier includes a third transistor of a first polarity arranged as a current generator, the emitter of said third transistor being connected to a supply terminal and the collector being coupled to the first terminal of the auxiliary line deflection coil, and a fourth transistor of a second polarity arranged as a current generator with an emitter thereof connected to a reference terminal and a collector coupled to the first terminal of the auxiliary line deflection coil, wherein, the current path of the collector of each of the third and fourth transistors of the transconductance amplifier power stage includes a diode connected between the respective collector and the first terminal of the auxiliary line deflection coil, each diode being arranged in a forward direction relative to the current of the respective associated third and fourth transistor.

7. In a television apparatus including an auxiliary line deflection coil and a video signal source providing a video signal, a beam scan velocity modulation circuit comprising:
a video signal differentiator circuit having an input coupled to an output of said video signal source,
a transconductance amplifier having an input coupled to output means of the video signal differentiator circuit and having a current generator type output power stage coupled to a first terminal of the auxiliary line deflection coil, and
a voltage amplifier having an input coupled to the output means of the video signal differentiator circuit and having a voltage generator type power stage coupled to a second terminal of the auxiliary line deflection coil.

8. The television apparatus as claimed in claim 7 wherein the transconductance amplifier further comprises a gain control stage whose gain decreases when a current in the current generator type output power stage increases.

9. The television apparatus as claimed in claim 7 wherein the current generator type output power stage comprises first and second transistors of opposite polarity type coupled between a terminal of a source of low DC voltage and a voltage reference point and with a junction point therebetween operative as the output of said current generator type output power stage.

10. The television apparatus as claimed in claim 9 further comprising a first diode connected between said junction point and a first main electrode of the first transistor and a second diode connected between said junction point and a first main electrode of the second transistor.

11. The television apparatus as claimed in claim 7 further comprising:
a source of DC supply voltage coupled to said transconductance amplifier and to said voltage amplifier, and wherein
said current generator type output power stage and said voltage generator type power stage together produce a voltage across the terminals of the auxiliary line deflection coil that is higher than the DC supply voltage.

12. The television apparatus as claimed in claim 7 wherein said voltage generator type power stage comprises first and second transistors of opposite polarity type coupled between a terminal of a source of low DC voltage and a voltage reference point and with a junction point therebetween operative as the output of said voltage generator type power stage, and having bases coupled in common to a source of switching voltage whereby the output of the voltage generator type power stage is alternatively coupled to the source of DC voltage and to the voltage reference point.

13. The television apparatus as claimed in claim 12 wherein said source of switching voltage is a part of said voltage amplifier and is controlled by the output of the video signal differentiator circuit.

\* \* \* \* \*